(12) United States Patent
Sullivan

(10) Patent No.: US 7,149,149 B2
(45) Date of Patent: Dec. 12, 2006

(54) ACOUSTIC FLOW NOISE CANCELLATION USING A REFERENCE HYDROPHONE

(75) Inventor: Edmund J. Sullivan, Portsmouth, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 1376 days.

(21) Appl. No.: 09/972,295

(22) Filed: Oct. 5, 2001

(65) Prior Publication Data

US 2006/0215493 A1  Sep. 28, 2006

(51) Int. Cl.
*G01S 3/80* (2006.01)

(52) U.S. Cl. ..................... 367/126; 367/901
(58) Field of Classification Search ........... 367/126, 367/901
See application file for complete search history.

(56) References Cited

U.S. PATENT DOCUMENTS

| 4,388,711 | A | * | 6/1983 | Fay | 367/901 |
| 5,068,834 | A | * | 11/1991 | Fromont | 367/901 |
| H1357 | H | * | 9/1994 | Ng et al. | 367/901 |

* cited by examiner

*Primary Examiner*—Dan Pihulic
(74) *Attorney, Agent, or Firm*—James M. Kasischke; Jean-Paul A. Nasser; Michael P. Stanley

(57) ABSTRACT

The present invention relates to a system and a method for substantially eliminating flow noise from the signal output of each hydrophone in a hull mounted acoustic array. The system comprises a plurality of hydrophones forming an acoustic array mounted to a hull of a marine vessel, at least one reference hydrophone mounted to the hull in a laminar region of fluid flow over the hull, and a computational device for generating an output signal for each hydrophone in the acoustic array which is substantially free of flow noise using signals inputted from the acoustic array hydrophones and the at least one reference hydrophone.

16 Claims, 4 Drawing Sheets

ACOUSTIC FLOW NOISE CANCELLATION USING A REFERENCE HYDROPHONE

STATEMENT OF GOVERNMENT INTEREST

The invention described herein may be manufactured and used by or for the Government of the United States of America for governmental purposes without the payment of any royalties thereon or therefore.

CROSS REFERENCE TO RELATED PATENT APPLICATIONS

Not applicable.

BACKGROUND OF THE INVENTION (1) Field of the Invention

The present invention relates to a system and a method for substantially eliminating flow noise from the signal outputs of the hydrophones of a hull mounted acoustic array.

(2) Description of the Prior Art

The signal outputs of the hydrophones on hull-mounted acoustic arrays, such as the arrays mounted on the hulls of marine vessels such as surface ships, submarines and torpedoes, are corrupted by what is commonly known as "flow noise". This is the noise produced by turbulent flow of a fluid over the hydrophones. The turbulent flow produces pressure fluctuations such that the hydrophones of the array cannot distinguish the resulting noise from the actual propagating acoustic energy of interest. This phenomenon is sometimes referred to as "pseudosound".

When a hydrodynamically shaped body, such as a torpedo, moves through the water, the flow over the forward or nose region is laminar. At a certain point behind the nose, called the transition region, the flow "trips" or becomes turbulent. This region is referred to as the transition region and is quite well-defined. As the flow proceeds beyond the transition region, it remains turbulent. This is known as the "fully developed" region. FIG. 1 depicts a hydrodynamically shaped torpedo body 10 with the laminar region 12, the transition region 14, and the fully developed region 16. The phenomenon just described is also true for ships and submarines.

Various methods for removing flow noise have been attempted. For example, U.S. Pat. No. 4,388,711 to Fay illustrates an apparatus for rejecting turbulence induced flow noise for towed hydrophone arrays. In this apparatus, two adjacent hydrophones in the array are spaced less than flow noise coherence distance apart forming a flow noise canceling module. The inverted acoustic/flow noise signal from the lead hydrophone of the pair is split, one side passing to the final stage of signal processing while the other side, filtered, amplified, and inverted, is added to the combined signal from the lag hydrophone which has been filtered and amplified. The acoustic signal components cancel leaving only the lead hydrophone flow noise plus the lag hydrophone flow noise which has been shifted by a factor dependent upon tow vessel speed and hydrophone spacing. This flow noise signal is then combined in an adder-inverter with the delayed feedback from the output stage of this same adder-inverter, canceling the lag hydrophone flow noise leaving only the flow noise of the lead hydrophone which is then combined with the acoustic signal plus flow noise output of the lead hydrophone. The flow noise components cancel yielding only the signal of interest, free of flow noise and undistorted by minor phase shifts.

U.S. Pat. No. 5,068,834 to Fromont relates to a method and a device for causing the signal of each hydrophone of an antenna such as a hull mounted array of hydrophones to be rid of the component due to the vibrations of a close to which the antenna is placed. To this end, a correction signal is deducted from the signal of the hydrophone. This correction signal takes account of the vibrations of the wall measured by sensors placed on the wall, in the vicinity of the antenna. The study of the circuit which enables this correction signal to be given is done by resolving the vibration of the wall into its dominant modes of deformation.

U.S. Statutory Invention Registration No. H1357 relates to an active sound cancellation system for time varying signals. In this system, a high-speed control utilizes a weighted combination of open and closed-loop inputs to provide a correction signal to a cancellation source. The cancellation source introduces a canceling acoustic wave that is equal in amplitude but 180 degrees out of phase with respect to the acoustic noise in order to cancel the acoustic noise within the system. The open-loop input is provided by a database containing a predicted, off-line model of the acoustic noise. The closed-loop input is provided by a combination of (1) an input signal generated by the input acoustic wave and feedback from the cancellation source as measured by an input sensor and (2) an error signal generated at the output of the system as measured by an error sensor. The weighted combination of the open and closed-loop inputs is chosen to minimize the error signal.

The present method of removing flow noise is to use hydrophones that have an aperture that is larger than the characteristic length or "scale" of the turbulence. In this approach. if the apertures of the individual hydrophones are larger than this scale, then the pseudosound tends to cancel over this aperture. This is sometimes referred to as "k-space filtering" or "spatial filtering". If the apertures of the individual hydrophones are not large enough, several adjacent hydrophones can be grouped into a single effective hydrophone.

There are two disadvantages to this approach. First, the grouping of individual hydrophones may not be practical due to spatial limitations. Second, it is only partially effective, i.e. it cannot remove all of the flow noise.

SUMMARY OF THE INVENTION

Accordingly, it is an object of the present invention to provide a system for substantially eliminating flow noise from the signal outputs of the hydrophones in a hull-mounted acoustic array.

It is a further object of the present invention to provide a method for substantially eliminating flow noise from the signal outputs of the hydrophones in a hull-mounted acoustic array.

The foregoing objects are attained by the system and the method of the present invention.

In accordance with the present invention, a system for substantially eliminating flow noise from the signal outputs of the hydrophones of a hull mounted acoustic array is provided. The system broadly comprises a plurality of hydrophones forming an acoustic array mounted to a hull of a marine vessel, at least one reference hydrophone mounted to the hull in a laminar region of fluid flow over the hull, and means for generating an output signal for each hydrophone in the array which is substantially free of flow noise using signals inputted from the acoustic array hydrophones and the at least one reference hydrophone.

A method for substantially eliminating flow noise from the signal output of each hydrophone in a hull mounted acoustic array is also provided. The method broadly comprises the steps of mounting an acoustic array having at least one hydrophone to a hull of a marine vessel, mounting a reference hydrophone to the hull in a laminar region of fluid flow over the hull, inputting a signal from each said hydrophone in said array into a computation device, inputting a signal from the reference hydrophone into the computation device, and generating an output signal for each hydrophone in the acoustic array which is substantially free of flow noise using the computation device and the inputted signals.

Other details of the system and the method of the present invention, as well as other objects, and advantages attendant thereto, are set forth in the following detailed description and the accompanying drawings wherein like reference numerals depict like elements.

DESCRIPTION OF THE PREFERRED EMBODIMENT(S)

Figure 1:
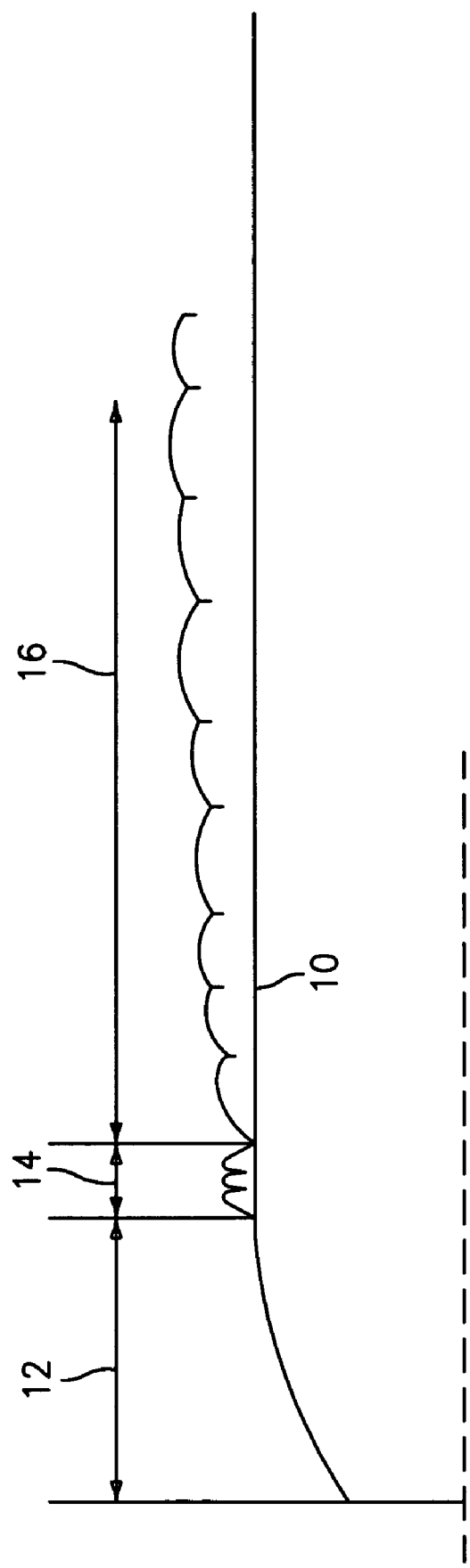
FIG. 1 is a schematic representation of the fluid flow over a hydrodynamically shaped hull of a marine vessel.
Figure 2:
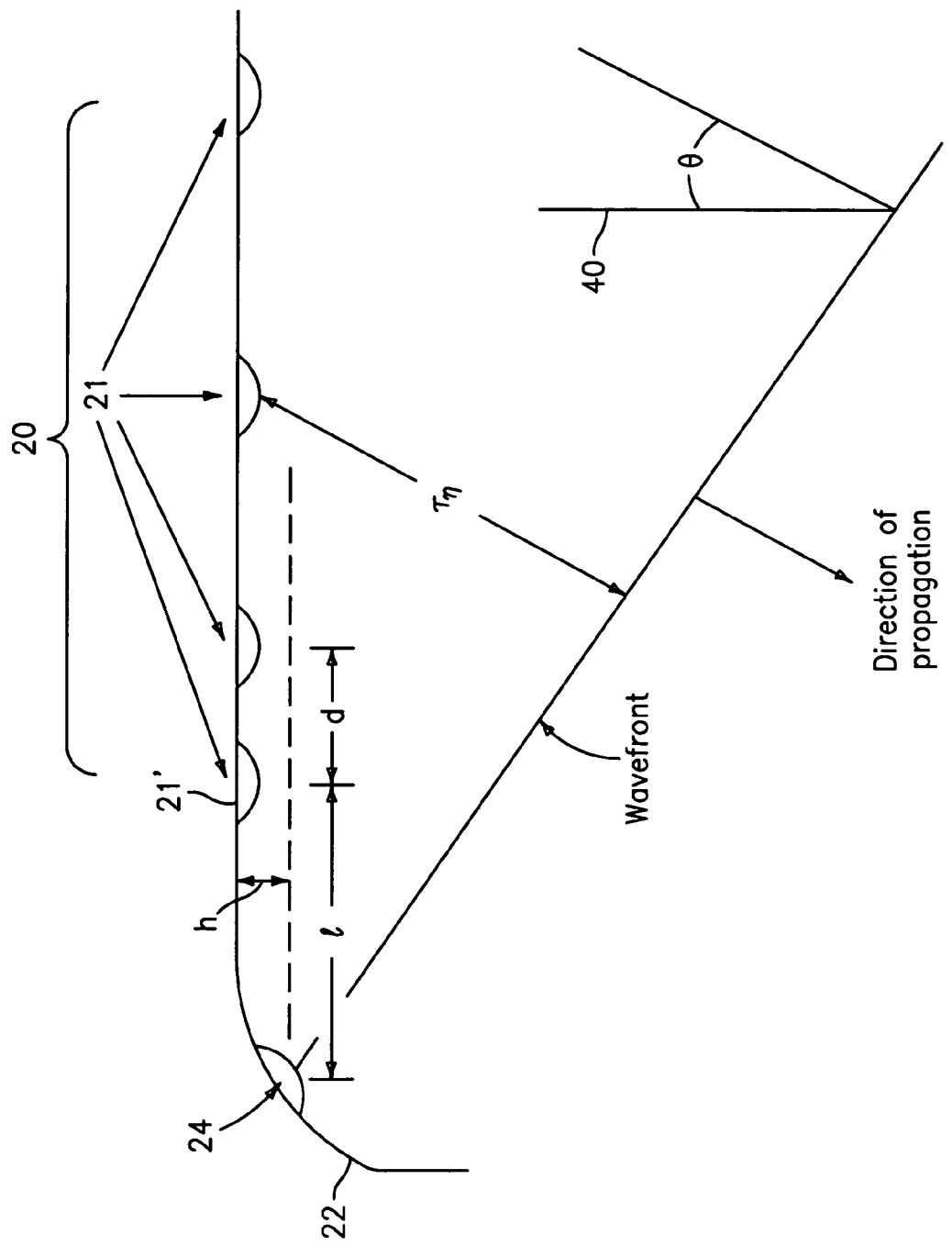
FIG. 2 is a schematic representation of a portion of a system for substantially eliminating flow noise from the signal outputs of the hydrophones of a hull mounted acoustic array in accordance with the present invention showing the physical relationships between certain elements of the system.
Figure 3:
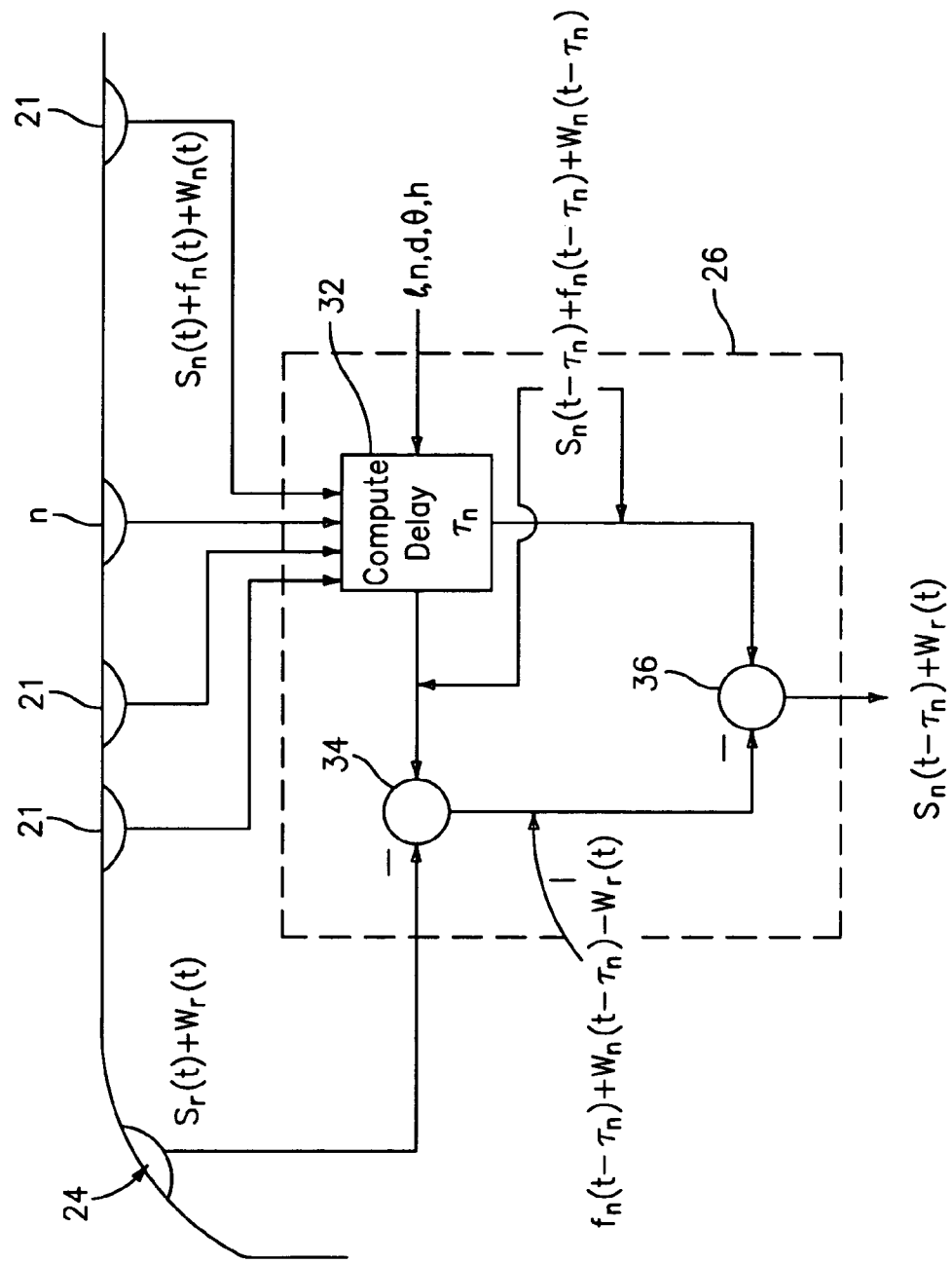
FIG. 3 illustrates further details of the system of the present invention.

Referring now to the drawings, FIGS. 2 and 3 show a system for substantially eliminating the flow noise from the signal output of each hydrophone 21 in an acoustic array 20. As shown in these figures, an array 20 of hydrophones 21 is mounted to or within the hull 22 of a marine vessel such as a surface ship, a submarine, or a torpedo. The hydrophones 21 may comprise any suitable hydrophones known in the art. The array 20 may have any desired number N of hydrophones 21. Preferably, the hydrophones 21 are uniformly spaced from each other by a distance d.

In accordance with the present invention, a reference hydrophone 24 is mounted to or within the hull 22. The reference hydrophone 24 is located in a region where there is laminar fluid flow over the hull 22. By placing the reference hydrophone 24 in this location, its signal output will not contain any flow noise. This is different from the output signals of the hull mounted hydrophones 21. The output signals of the hydrophones 21 will contain flow noise since these hydrophones 21 are located in a region where there is turbulent flow over the hull 22.

As can be seen from FIG. 2, the reference hydrophone 24 is spaced from a first one 21' of the hydrophones in the acoustic array by an axial distance 1. Still further, due to the hydrodynamic shaping of the hull 22, the reference hydrophone 24 is located in a different plane than the plane containing the hydrophones 21. This planarity difference is shown in FIG. 2 by the designation h.

The system of the present invention also contains a computation device 26 which may comprise any suitable processor unit known in the art. The computation device 26 may be programmed in any suitable language known in the art to carry out the processing which will be discussed hereinafter. As can be seen in FIG. 3, the computation device 26 receives an output signal from each hydrophone 21 in the acoustic array 20 and an output signal from the reference hydrophone 24. Other parameters that will be needed to carry out the method of the present invention may be inputted into the computation device 26 using any suitable means known in the art including but not limited to manual input means. For example, parameters such as the distance 1, the planarity difference h, the spacing d of the hydrophones 21, the identity n of a particular hydrophone 21 whose output signal is being processed, and the speed of sound c in water may be inputted using a manual input device such as a keyboard. Alternatively, these parameters may be inputted from an external or internal memory device (not shown) containing the information.

The method of the present invention is depicted in FIG. 3. The output signals of the reference hydrophone and a nth hydrophone being inputted into the computation device 26 are designated by $p_r(t)$ and $p_n(t)$ respectively. Each output signal has several components which are set forth in equations 1 and 2. They are:

$$p_r(t)=s_r(t)+w_r(t), \quad (1)$$

and $$p_n(t)=s_n(t)+f_n(t)+w_n(t) \quad (2)$$

where $s_r(t)$ and $s_n(t)$ designate the desired acoustic signal components at the respective hydrophones 24 and n, $f_n(t)$ designates the flow noise component at the hydrophone n, and $w_r(t)$ and $w_n(t)$ designate ambient noise components, i.e. acoustic noise due to distant shipping, surface generated noise or any acoustic (radiative) noise that is not part of the desired signal.

The signal inputted into the computation device 26 from the hydrophone n needs to be modified to account for the time delay between the time that a particular acoustic noise is detected by the reference hydrophone 24 and the hydrophone n as a result of the shape of the hull. To do this, the distance l, the planarity difference h, the hydrophone spacing d, the identity n of the hydrophone whose signal is being processed, the speed of sound c, and the angle θ at which a detected acoustic noise arrives are inputted into a time delay computation module 32 which then calculates the time delay $\tau_n$ using the inputted information. By inserting the appropriate time delay $\tau_n$ in the output signal for hydrophone n, it can be said that $$s_n(t-\tau_n)=s_r(t). \quad (3)$$

From FIG. 2, it can be seen that the time delay $\tau_n$ for hydrophone n can be determined from the following equation:

$$\tau_n=[l+(n-1)d]\sin\theta+h\cos\theta/c. \quad (4)$$

where c is the speed of sound in water, n is the identity of the hydrophone whose signal is being processed and has a value from 1 to N, d is the distance between adjacent hydrophones 21, l is the distance from the reference hydrophone 24 to the closest one of the hydrophones 21 in the acoustic array, h is the planarity difference, and θ is the signal arrival angle. Although it is not necessary, for simplicity, equation (4) assumes that the array 20 of hydrophones has no curvature along the length of the marine vessel. The values of l and h are fixed and are determined by the shape of the nose of the marine vessel and the position of the reference hydrophone 24.

After the time delay $\tau_n$ has been inserted into the output signal of hydrophone n, the delayed hydrophone output signal may be expressed as $s_n(t-\tau_n)+f_n(t-\tau_n)+w_n(t-\tau_n)$.

Thereafter, the computation device 26, using a subtraction module 34, forms a signal-free sample of flow noise plus ambient noise. This is done by inputting the output signal $p_r t$ of the reference hydrophone 24 into the module 34 along with the delayed hydrophone output signal for hydrophone n. In the module 34, the output signal of the reference hydrophone 24 is subtracted from the delayed hydrophone output signal. The following equation expresses this subtraction operation:

$$p_n(t-\tau_n)-p_r(t)=f_n(t-\tau_n)+w_n(t-\tau_n)-w_r(t) \quad (5)$$

As previously mentioned, this operation provides a signal-free sample of the flow noise plus the ambient noise terms. The final step of processing the output signal for the hydrophone n is to subtract the signal free sample from the properly delayed output of the nth hydrophone. This is done in the subtraction module 36 and yields an output signal having two components—namely, a first component representing a time delayed signal for hydrophone n and a second component representing the ambient noise at the reference hydrophone. The output signal does not contain any flow noise component. The processing which occurs in the module 36 and the output signal which results is expressed by the following equation:

$$p_n(t-\tau_n)-f_n(t-\tau_n)-w_n(t-\tau_n)+w_r(t)=s_n(t-\tau_n)+w_r(t). \quad (6)$$

Using the method of the present invention, it is the ambient noise at the reference hydrophone 24, and not that of the hydrophone n that survives.

In accordance with the present invention, the foregoing method is carried out by the computation device for each hydrophone 21 in the array 20.

Figure 4:
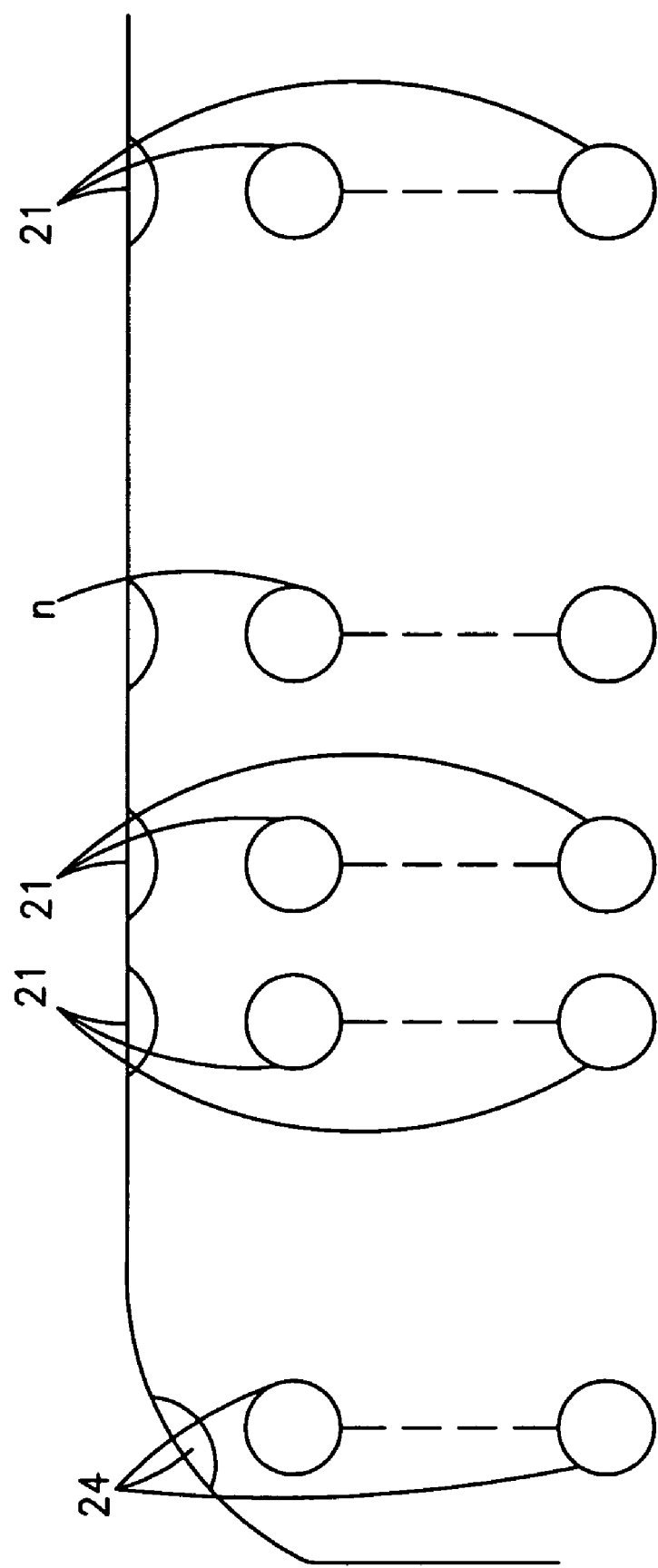
FIG. 4 illustrates a portion of a system having more than one row of hydrophones.

Referring now to FIG. 4, some hull mounted acoustic arrays contain more than one row of hydrophones 21. In such a system, a reference hydrophone 24 is provided for each row. As before, each reference hydrophone 24 is mounted in a region of the hull 22 where laminar flow occurs. In such a system, the computation device 26 is configured so that each row of hydrophones is on a separate channel and the output signal of only one of the reference hydrophones is received by each respective channel.

In cases where the signal arrive angle θ is negative, i.e., the signal is arriving from the left of the vertical axis 40 shown in FIG. 2, then the time delays must be applied to the output signal of the reference hydrophone(s) 24 rather than the output signals from the hydrophones 21.

While the method of the present invention is mainly intended for the case of flow noise, in principle it can remove any noise that appears in the output of a hydrophone of interest but not in the output of the reference hydrophone. For example, propulsion noise, which can be a problem in ships and torpedoes, can be dealt with in many cases. Consider the case of propulsion noise in a hull mounted torpedo array. In most cases, a propulsor is mounted toward the rear of the torpedo. Vibrations will propagate up the shell of the torpedo, producing noise in the array hydrophones. Because such vibrational energy radiates into the water, and also due to the effect of the strengthening ribs in a typical torpedo shell, the vibrational energy suffers losses as it propagates forward in the shell. This means that there is more vibrational noise affecting the hydrophones in the array than the reference hydrophone. The method described herein will tend to improve the signal to vibration noise ratio in the hydrophone outputs by canceling that component of the vibrational noise that does not appear in the output of the reference hydrophone. This result could not be achieved using a spatial filtering approach.

Yet another advantage to the method of the present invention is that, unlike the spatial filtering approach, the method of the present invention has the potential of removing all of the flow noise.

Since turbulent flow can induce mechanical vibrations in the hull that can propagate to other arrays, the signal free sample of the flow noise (equation (5)), when properly delayed, could be used to remove the effects of these mechanical vibrations from other arrays mounted on the hull such as an array on the nose of a torpedo.

It is apparent that there has been provided in accordance with the present invention a system and a method for acoustic flow noise cancellation using a reference hydrophone which fully satisfies the objects, means, and advantages set forth hereinbefore. While the present invention has been described in the context of specific embodiments thereof, other alternatives, modifications, and variations will become apparent to those skilled in the art having read the foregoing description. Therefore, it is intended to embrace those alternatives, modifications, and variations as fall within the broad scope of the appended claims.

What is claimed is:

1. A system for substantially eliminating flow noise from the signal output of each hydrophone in a hull mounted acoustic array which comprises:
   a plurality of hydrophones forming an acoustic array mounted to a hull of a marine vessel;
   at least one reference hydrophone mounted to said hull in a laminar region of fluid flow over said hull; and
   means for generating an output signal for each hydrophone in said array which is substantially free of flow noise using signals inputted from said acoustic array hydrophones and said at least one reference hydrophone.

2. A system according to claim 1 wherein said reference hydrophone is located in a first plane different from a second plane containing said hydrophones in said acoustic array.

3. A system according to claim 1 wherein said output signal generating means comprises means for determining a time delay factor and for inserting said time delay factor into a signal from a respective hydrophone in said acoustic array to form a delayed hydrophone signal for said respective hydrophone in said acoustic array.

4. A system according to claim 3 wherein said output signal generating means further comprises means for subtracting a signal from said at least one reference hydrophone from said delayed hydrophone signal for said respective hydrophone to form a signal representing a free sample of the flow noise plus ambient noise terms.

5. A system according to claim 4 wherein said output signal generating means further comprises means for subtracting said signal representing said free sample of the flow noise plus ambient noise terms from said delayed hydrophone signal to yield said output signal for said respective hydrophone which is substantially free of flow noise.

6. A system according to claim 5 wherein said output signal for said respective hydrophone contains a first component representing a time delayed signal for the respective hydrophone and a second component representing ambient noise at said reference hydrophone.

7. A system according to claim 1 wherein said hydrophones in said acoustic array are uniformly spaced from each other.

8. A system according to claim 1 wherein said acoustic array comprises at least two rows of hydrophones with a plurality of hydrophones in each row and further comprising at least two reference hydrophones mounted in said laminar region.

9. A method for substantially eliminating flow noise from the signal output of each hydrophone in a hull mounted acoustic array, said method comprising the steps of:
(a) mounting an acoustic array having at least one hydrophone to a hull of a marine vessel;
(b) mounting a reference hydrophone to said hull in a laminar region of fluid flow over said hull;
(c) inputting a signal from each said hydrophone in said array to a computation device;
(d) inputting a signal from said reference hydrophone to said computation device; and
(e) generating an output signal for each said hydrophone in said array which is substantially free of flow noise using said computation device and said inputted signals.

10. A method according to claim 9 wherein said output signal generating step comprises:
(f) selecting a respective hydrophone in said array whose signal is to be corrected for flow noise;
(g) determining a planarity difference between said respective hydrophone and said reference hydrophone; and
(h) inputting said planarity difference into said computational means.

11. A method according to claim 10 wherein said output signal generating step further comprises:
(i) inputting a first parameter representing a spacing between each hydrophone in said array, a second parameter representing an axial distance between said reference hydrophone and the hydrophone in said array closest to said reference hydrophone, a third parameter identifying said respective hydrophone, a fourth parameter representing an angle at which an acoustic signal has arrived, and a fifth parameter representing the speed of sound in water; and (j) generating a time delay from said inputted parameters and said inputted planarity difference.

12. A method according to claim 11 wherein said output signal generating step further comprises (k) forming a delayed hydrophone signal by inserting the generated time delay into the input signal from the respective hydrophone.

13. A method according to claim 12 wherein said output signal generating step further comprises (l) subtracting said input signal from said reference hydrophone from said delayed first hydrophone signal to yield a signal representing a free sample of the flow noise plus ambient noise terms.

14. A method according to claim 13 wherein said output signal generating step further comprises (m) subtracting said signal representing said free sample from said delayed first hydrophone signal.

15. A method according to claim 14 further comprising repeating steps (f) through (m) for each hydrophone in said acoustic array.

16. A method according to claim 9 wherein:
said acoustic array mounting step comprises mounting at least two rows of hydrophones to said hull;
said reference hydrophone mounting step comprises mounting a reference hydrophone for each row to said hull in said laminar region;
said array hydrophone inputting step comprises inputting a signal from each hydrophone in each row into said computation device;
said reference hydrophone signal step comprises inputting a signal from each said reference hydrophone into said computation device; and
said output signal generating means comprising generating an output signal for each hydrophone in each row which is substantially free of flow noise using said computation device and said inputted signals.

* * * * *